Aug. 5, 1924.
W. DAVIS
1,503,938
COMBINED VEHICLE STEERING AND ELECTRIC MOTOR CONTROLLING MECHANISM
Filed Nov. 6, 1922
2 Sheets-Sheet 1
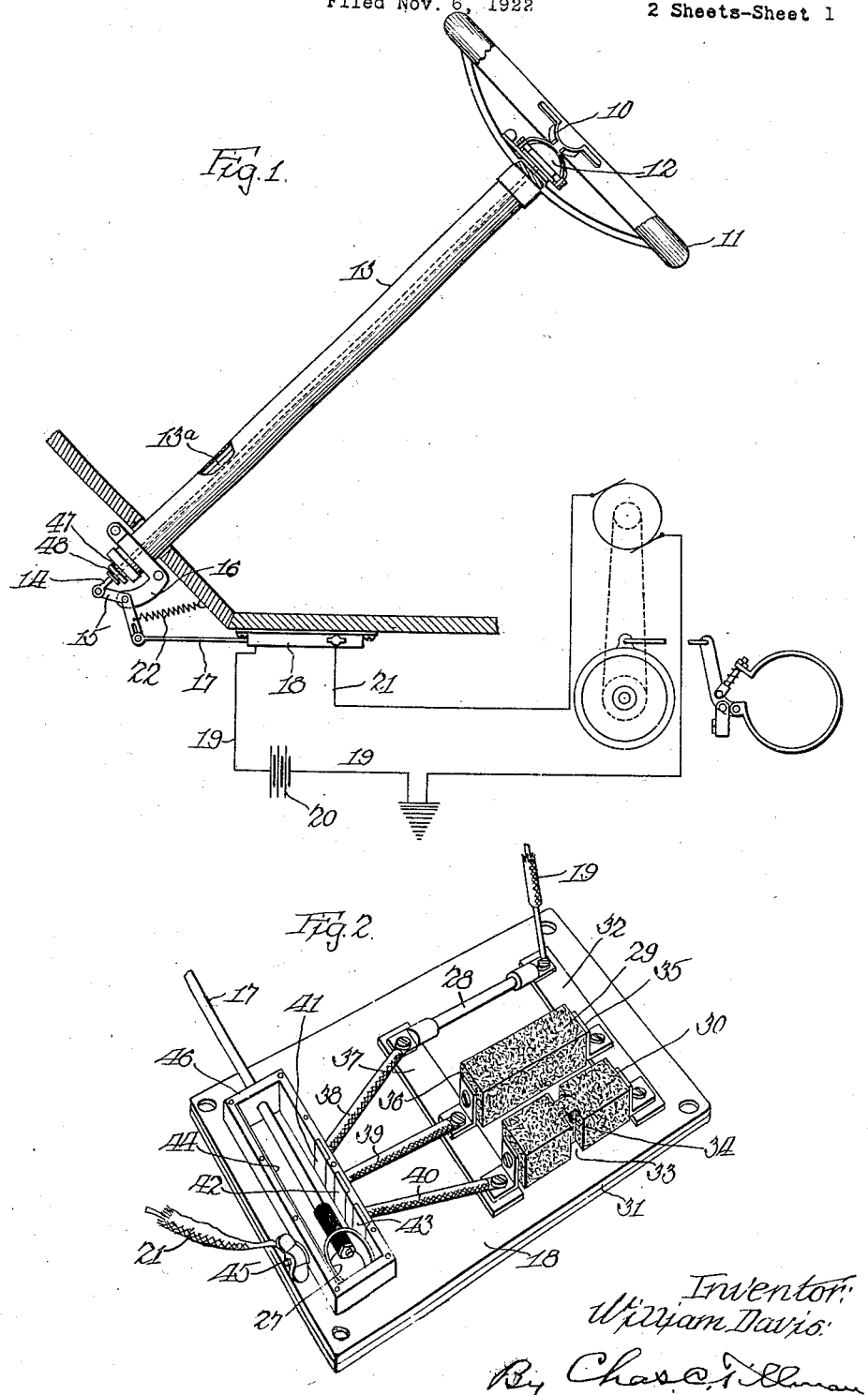

Aug. 5, 1924.  
W. DAVIS  
1,503,938  
COMBINED VEHICLE STEERING AND ELECTRIC MOTOR CONTROLLING MECHANISM  
Filed Nov. 6, 1922  
2 Sheets-Sheet 2
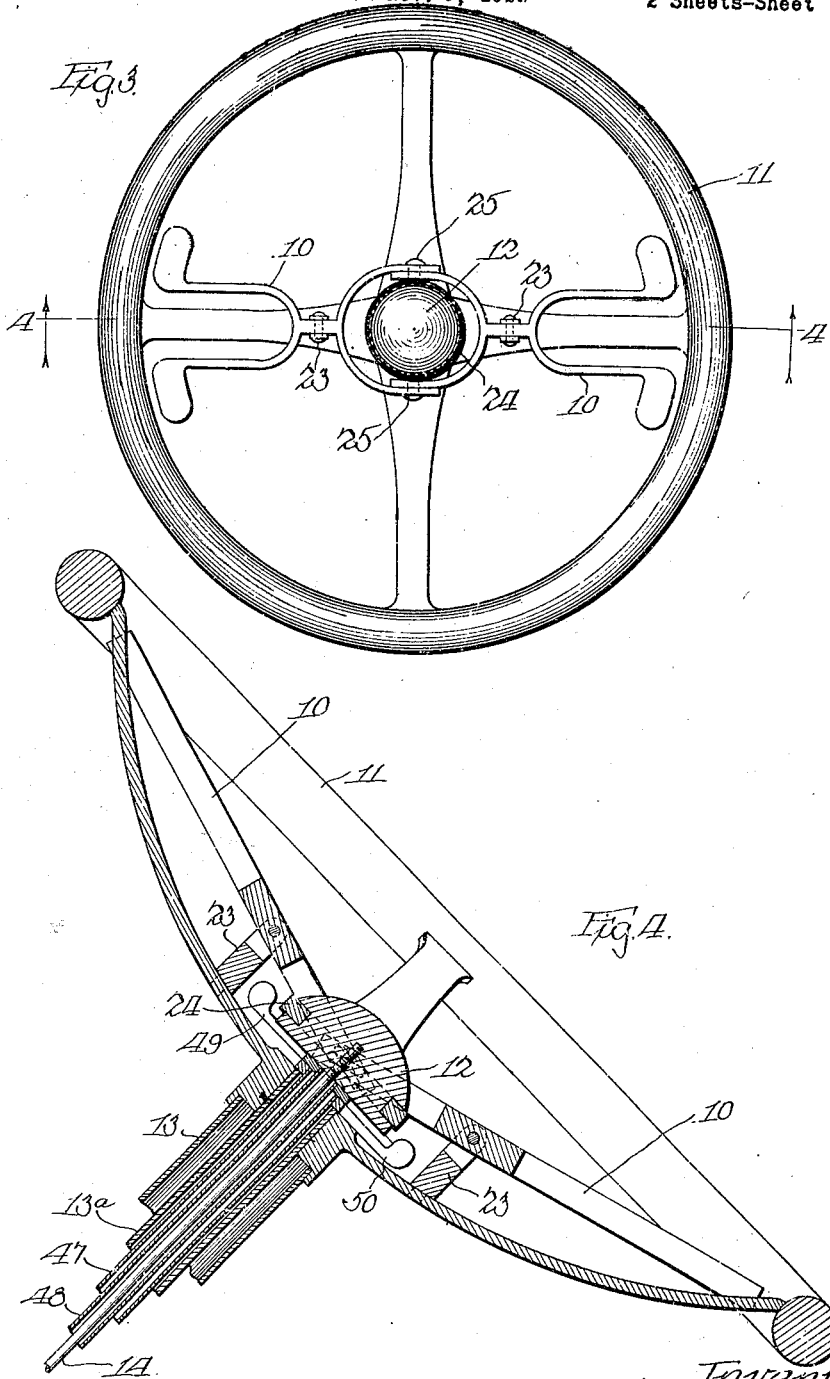

Patented Aug. 5, 1924.

1,503,938

UNITED STATES PATENT OFFICE.

WILLIAM DAVIS, OF CHICAGO, ILLINOIS.

COMBINED VEHICLE STEERING AND ELECTRIC MOTOR CONTROLLING MECHANISM.

Application filed November 6, 1922. Serial No. 599,250.

*To all whom it may concern:*

Be it known that I, WILLIAM DAVIS, a citizen of the United States, residing at Chicago, in the county of Cook and State of Illinois, have invented certain new and useful Improvements in a Combined Vehicle Steering and Electric Motor Controlling Mechanism, of which the following is a specification.

This invention relates to a combined vehicle steering and electric motor controlling mechanism whereby said motor may be conveniently controlled and operated at various speeds, depending upon the power required to perform or accomplish the desired work.

The present invention embodies, to a certain extent, the structural principle and features disclosed and claimed in Letters Patent No. 1,149,500, issued to me on the 27th day of March, 1923, in which patent I have disclosed a controlling mechanism for electric motors associated with the steering mechanism of a vehicle or automobile, wherein a reciprocable link or rod and a lever-mechanism for actuating the link and through it a switch for controlling a variable resistance whereby the speed of the motor may be varied.

In the aforesaid disclosure, the said link is shown as being located externally of the outer casing or housing of the steering post of the automobile and carried thereby, and the above referred to lever-mechanism is shown as being mounted on the lower surface of the steering wheel. This arrangement of the parts is efficient, but it permits of the exposure of said link to damage or accidental dislocation, and as the parts of the said lever mechanism are located below the steering wheel, it is manifest that their positions cannot as readily be seen or determined by the operator of the wheel, as if they were in a visible position.

The objects of my present invention are substantially the same as those set forth in my above named pending application for patent and are as follows:

To provide an arrangement whereby a motor controlled brake mechanism may be actuated so as to apply a variable force to the brakes so that the mechanism controlled by the brakes may be operated at various speeds or brought to a rest.

To provide a variable resistance between the motor for actuating the brake and the source of current for driving the motor, and in addition, to provide a means which is arranged remote to the variable resistance for actuating it, so as to accomplish the various advantages hereinbefore referred to.

To furnish a mechanism applicable for association with a vehicle such as an automobile and to arrange the actuating mechanism for the variable resistance at a convenient point from which it may be operated.

A further object of the invention is to furnish a mechanism of the above named general character, which shall be of such construction and arrangement of its parts that the lever-mechanism thereof may be mounted on the steering-wheel of a vehicle, in such a way, as to present itself with unobstructed vision to the operator and to afford certain advantages whereby it can be manipulated or actuated at any and all times, no matter what position the said wheel may occupy, and to shield or protect the reciprocable link or rod actuated by the lever-mechanism from injury or dislocation.

Other objects and advantages will become apparent from the following description and explanation.

The invention is particularly applicable for association with a mechanism such as shown and described in my aforesaid Patent No. 1,149,500, dated March 27, 1923, for improvements in an electrically operated brake mechanism for automobiles.

The invention contemplates the use of a lever-mechanism which is carried by the steering wheel of an automobile, this lever-mechanism being associated with a member mounted for reciprocable movement with respect to the outer casing or housing of the steering post.

A link connection is provided between said reciprocable member and a suitable bell crank lever which is mounted on the lower portion of the steering post. Another link connection is made between the bell crank lever and the variable resistance, thus as the lever-mechanism carried by the steering wheel and post is actuated, this variable resistance will also be actuated, causing the motor, not shown, which is in circuit with the resistance, to be actuated at various speeds, and as the motor is connected to the brake mechanism, diagrammatically shown, a variable resistance force will be applied to the brake mechanism which will permit the operator of the vehicle to release or apply the brakes so as to bring the motor to a stop or cause a variable resistance to be applied to reduce the speed of the vehicle or release it when this is found necessary or desirable.

The invention will be explained and more readily understood when read in conjunction with the accompanying drawings, which illustrate one embodiment of the invention, it being obvious that changes and modifications may be resorted to without departing from the spirit of the appended claim forming a part hereof.

In the drawings,—

Figure 1 illustrates a vehicle steering wheel mechanism and post having certain lever controls employed in the structure applied thereto, and showing the connections between the lever control and the variable resistance employed in the structure.

Fig. 2 is a detached perspective view of the variable resistance above referred to.

Fig. 3 is a plan view of the steering wheel of a vehicle showing the lever mechanism of the apparatus mounted on the upper surface thereof, and Fig. 4 is an enlarged sectional view taken on line 4—4 of Fig. 3 looking in the direction indicated by the arrows, showing a portion of the steering wheel mounted on a part of the outer casing of the steering post, a part of the steering post, a portion of the reciprocable link or rod and its connections with the lever mechanism and portions of other features or elements usually carried by the outer casing of the steering post.

The structure illustrated in the drawings for practicing the invention, comprises a lever mechanism generally designated 10, which is carried on the upper surface of the steering wheel 11 of an automobile, the reciprocable member 12, which is substantially semi-spherical in shape and mounted above the housing or outer casing 13 of the steering post generally designated 13ª, and a rod 14 which has one end thereof rigidly connected to the member 12 and has the opposite end attached to one end of the bell crank lever 15 which is mounted by means of a suitable bracket 16 on the outer casing 13 for the steering post. The said casing 13 is as usual fixedly mounted, and the steering post 13ª is extended there-through and into the hub of the steering wheel and fixed at its upper end to said hub.

The connecting rod 17 is employed which has its opposite ends respectively connected with the other arm of the bell crank lever 15 and a variable resistance generally designated 18.

As illustrated in Figs. 1 and 2, this variable resistance has a conductor 19 which leads to a battery 20, the latter of which is grounded by being connected with any suitable portion of the vehicle frame. The conductor 21 is also employed, which leads to the motor (diagrammatically shown) and is also grounded in a manner similar to the battery 20. A coiled spring 22 is connected with the bell crank lever 15 and is employed to maintain the parts in the relative positions shown in Fig. 1 of the drawings.

From the foregoing description, it is evident that upon the manipulation of either of the levers 10, the connecting rod 14 will be actuated through the medium of the reciprocable member 12 which is connected to the levers 10. The motion of the connecting rod 14 will be transmitted to the bell crank lever 15 which actuates the variable resistance generally designated 18, which, as before stated, is connected to the bell crank lever by means of the connecting rod 17. The levers 10—10 are secured to the steering wheels 11 by means of brackets 23 to which they are pivotally secured and by virtue of the connection between these levers and the steering wheel 11, the levers will be rotated with the steering wheel and therefore will at all times be positioned for ready actuation by the driver of the vehicle.

The adjacent ends of the levers 10 are forked and slotted and are connected to the collar 24 having radial pins 25 which extend into the slots of the forks of the levers. The collar 24 is rotatably mounted in an annular groove in the member 12, as is clearly shown in Fig. 4 of the drawings.

From the foregoing explanation it is evident that when either of the levers 10 is actuated, the member 12 will be moved longitudinally with respect to the steering post. It is further manifest that by the provision of the annular groove in the reciprocable member 12, the levers 10 may be rotated with the steering wheel with respect to the member 12 and the steering post, and by virtue of the conections between the member 12 and the variable resistance, the latter will be actuated.

The elements entering into the structure of this variable resistance are clearly shown in Fig. 2 of the drawings. This variable resistance includes the electric switch 27 which is connected to an end of the connecting rod 17 and the variable resistance elements 28, 29 and 30, all of which are mounted upon the panel 31 which may be of any suitable material such as asbestos, fibre or some other insulating material.

The resistance elements 28, 29 and 30 offer a variable resistance to the current as the same passes from the conductor 19, the element 28 offering the least resistance, the element 29 a relatively greater resistance, and the element 30 the greatest resistance. These elements 28, 29 and 30 are all in electrical contact with a conductor 32 which is also connected to the conductor 19 leading from the battery 20. The resistance elements 29 and 30 are preferably constructed of carbon blocks, the element 30 being cut away as indicated at 33 so as to provide the relatively small portion 34 which will add to the resistance of the current passing through this element, and will therefore offer a greater resistance to the current than is offered by the element 29 or the element 28. These resistance elements 28, 29 and 30 have secured at their opposite ends suitably shaped brackets 35 and 36, whereby these elements are secured to the conductor 32 and the insulating strip 37. The conductors 38, 39 and 40 respectively lead from the resistance elements 28, 29 and 30, and have their opposite ends connected to the contact elements 41, 42 and 43, the latter of which co-operates with the switch element 27 connected to the operating rod 17. The switch element 27 is preferably formed of any suitable flexible material and is U-shaped as illustrated in Fig. 2 and normally assumes a neutral position from which it is moved into contact with one or the other of the contact elements 41, 42 and 43. The separated arms of the U respectively engage the contact elements 41, 42 and 43 when positioned to permit of this, and also contacts with the conductor 44, which is connected to the conductor 21 and the motor, not shown, by means of the thumb screw 45. The switch 27 is confined in a rectangular shaped guide-way 46 which is constructed of some suitable insulating material, it being of course understood that the entire mechanism illustrated in Fig. 2 may be encased to protect it from various substances which it may be subjected to when secured to a vehicle.

From the foregoing description of the mechanism, it is evident that an arrangement is provided for controlling an electric motor and which is particularly adaptable for association with the steering mechanism of a vehicle permitting the means for actuating the controlling mechanism to be positioned so that it is readily accessible for use by the driver of the vehicle with either or both of his hands, when applied to the steering wheel, no matter in what position said wheel may be located or turned.

Furthermore, it is evident that as the reciprocable link or rod 14 is located within the hollow steering post 13ᵃ and also within the outer casing 13 for said post, that it will be protected against damage or accidental dislocation. It is also apparent that by mounting the inner ends of the levers 10 for rotation with respect to the reciprocable member 12, which latter member is located above the upper end of the hub of the steering wheel, as well as said levers, the latter will always be visible to the operator of the vehicle thus enabling him to actuate the levers at any time and without having any difficulty in locating their positions.

In Fig. 4 of the drawings I have shown the hollow steering post 13ᵃ as having mounted therein tubular members 47 and 48, one of which may lead to the mechanism for operating the throttle valve and the other to the mechanism for controlling the sparking device of the machine. These tubular members 47 and 48 may be operated by means of arms 49 and 50 leading from the upper portion of said tubular members. As these elements 47 to 50 inclusive form no part of the present invention, it is deemed unnecessary to enter into further details of their construction and operation.

As shown in Fig. 3 of the drawings, the outer end of each of the levers 10 is forked and the prongs of each fork are located side by side yet spaced a suitable distance from each other. By this arrangement it is evident that the reciprocable member 12 may be actuated by pressing on any one of the prongs, and that as they are separated from one another, one of them will always be in position to be actuated by one of the hands of the operator.

Having thus fully described my invention, what I claim as new and desire to secure by Letters Patent, is—

The combination with a hollow post and a wheel secured to one end thereof; of a rod mounted for reciprocation within said post and protruding at one end beyond the same, a thread on said protruding end, a head having an internally threaded socket engaged upon the said threaded end of the rod, the said head having an annular channel in its side, a ring in said channel, a pair of levers pivoted inwardly of their ends upon the outer face of said wheel and disposed in opposite directions from said head, yokes at the inner ends of said levers connected to said ring, and the outer ends of said levers disposed adjacent to the rim of the wheel.

WILLIAM DAVIS.